Patented Jan. 13, 1953

2,625,549

UNITED STATES PATENT OFFICE 2,625,549

SYNTHESIS OF 3-[BETA-KETO-GAMMA-(2-PIPERIDYL) PROPYL] - 4 - QUINAZOLONE COMPOUNDS

Bernard R. Baker, Nanuet, N. Y., and Merle V. Querry, Westwood, N. J., assignors to American Cyanamid Company, New York, N. Y., a corporation of Maine No Drawing. Application March 17, 1951, Serial No. 216,261

10 Claims. (Cl. 260—256.4)

This invention relates to a new method of preparing compounds having antimalarial activity, and more particularly to compounds represented by the formula:

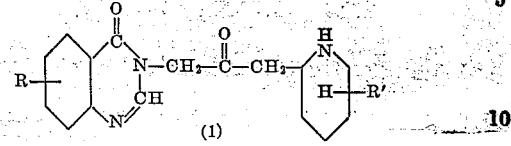

where R is hydrogen or at least one substituent on the quinazolone nucleus and in which R' is hydrogen or a substituent attached to the piperidine nucleus by an oxygen to carbon linkage. Compounds of the above formula constitute the subject matter of a co-pending U. S. application S. N. 184,118 by B. R. Baker and R. E. Schaub filed September 9, 1950.

The substituent or substituents represented by R in the above formula may vary within wide limits and may be on one or more of the two, five, six, seven or eight positions of the quinazolone nucleus. Substituents of the following types are of value: halogen, for instance Cl, Br, and Fl; alkoxy and aryloxy, for instance —OCH₃, —OC₂H₅, —OCH₂C₆H₅, and —OC₆H₅; hydroxyl radicals; lower alkyl radicals, for instance methyl, ethyl, propyl and butyl; aryl radicals, for instance phenyl and substituted phenyl radicals; acyl radicals, for instance —COR in which R is hydrogen or lower alkyl; acyloxy radicals, for instance —OCOR in which R may represent H or lower alkyl; carboxyl radicals (—COOH) and the esters, amides and salts thereof.

The radical represented by R' in the above formula may also vary within wide limits as long as it is attached to the piperidine nucleus by an oxygen to carbon linkage. By way of illustration, suitable substituents are: hydroxy; aryloxy, for instance, phenoxy; alkoxy, for instance methoxy, ethoxy and propoxy; aralkoxy, for instance, alphatoloxy; acyloxy, for instance acetoxy and benzoloxy; and the like. Such substituents may be on one or more of the three, four, five and six positions of the piperidine nucleus.

While compounds of the above formula can be prepared in numerous ways it has been found that they may conveniently be prepared under certain conditions by the catalytic reduction of the corresponding tetrahydropyridyl compounds in accordance with the following equation:

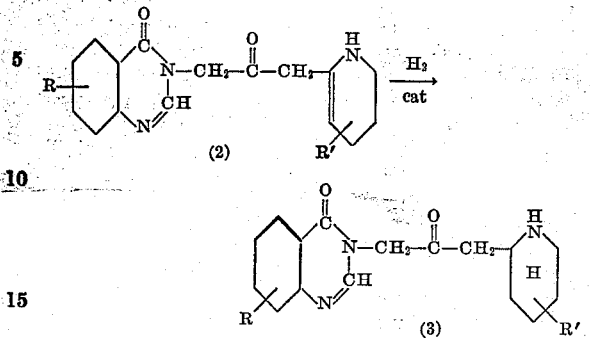

in which R and R' are as defined above. Tetrahydropyridyl compounds of the formula (2) above constitute the subject matter of a co-pending U. S. application S. N. 216,262 by B. R. Baker filed concurrently herewith.

If one attempts to hydrogenate a compound represented by the formula (2) above under ordinary conditions it will be found that the quinazolone nucleus and/or the carbonyl group are to a large extent reduced before the reduction of the tetrahydropyridyl nucleus is accomplished. This not only results in an excessive waste of starting materials but also results in a mixture of reduction products which is next to impossible to separate. By the method of this invention, however, it is possible to hydrogenate the tetrahydropyridyl nucleus of compounds represented by the formula (2) above without undue reduction of the quinazolone nucleus or the carbonyl group.

The process of this invention comprises hydrogenating the 3-[beta-keto-gamma-(tetrahydro-2-pyridyl)propyl]-4-quinazolone compound in a strongly acidic medium. The product may then be obtained from the reaction mixture as the acid addition salt of the acid employed to acidify the reaction mixture or the reaction mixture may be neutralized and the product obtained as the free base.

The reasons for the selective reduction of the tetrahydropyridyl group under acidic conditions are not fully understood but are believed to be due to the presence or absence of resonance in the quinazolone and tetrahydropyridyl nuclei. As is well known by those skilled in the art, unsaturated compounds displaying the phenomenon of resonance usually show greatly increased stability over corresponding compounds in which resonance is not present. This may be illustrated by, for instance the benzene ring which is much more difficult to hydrogenate than, for instance cyclohexene. If then the quinazolone nucleus and the tetrahydropyridyl nucleus of 3-[beta-keto-gamma - (tetrahydro - 2 - pyridyl) propyl] -4-quinazolones were both resonant groups, it might be expected that one would experience difficulty in reducing one group without at the same time reducing the other or in reducing either without also reducing the carbonyl group. Further, if the resonance in one of these groups could be destroyed without destroying the resonance in the other, it might be possible to selectively reduce the one group without undue reduction of other portions of the molecule.

While there would appear to be no resonance in compounds of the formula

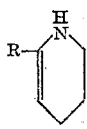

where R is alkyl, as such compounds are readily reduced in neutral solution with a variety of catalyst, it is believed that the introduction of a carbonyl group in the beta position of the side chain does result in resonance, at least in neutral solution. This is indicated by the presence of strong peaks at about 310m$\mu$ in the ultra violet absorption spectrum of compounds of the formula (2) above which peaks cannot be explained by the other portions of the molecule. If then this resonance of the tetrahydropyridyl group is, in some unexplained manner, destroyed by a highly acidic medium without in turn destroying the resonance of the quinazolone nucleus, it might be theoretically possible to selectively reduce the former without undue reduction of the carbonyl group or the quinazolone nucleus. While this would appear to be the most logical reason for the success of the new process, it is not intended that this invention be limited by chemical theory and the invention is to be construed as covering these new reactions regardless of the mode of their operation.

The new reaction is preferably performed in aqueous solution. The reaction may also be performed in various organic solvents as illustrated by the following: aliphatic alcohols, for instance ethyl alcohol; cyclic ethers, for instance dioxane; glycol ethers, for instance 2-methoxyethanol; and lower fatty acids, for instance acetic acid. The solution may be made acidic with almost any nonoxidizing mineral acid, for instance hydrochloric, hydrobromic, sulphuric and phosphoric, or the solution may be made acidic with certain organic acids, for instance toluene sulfonic. It is important, however, that the acid have a dissociation constant in water at 25° C. of at least about $1 \times 10^{-2}$ as the selectivity of the reaction decreases rapidly with weaker acids. The concentration of the acid may vary within wide limits but the acid should be present in a molar quantity at least equal to the tetrahydropyridyl compound and preferably in excess. In fact, the reaction proceeds satisfactorily in acid concentrations of about 1N to 21N and acid concentrations of 4N to 8N are preferred.

Suitable catalysts are illustrated by the following: metals of group VIII of the sixth period, for instance platinum; metals of group VIII of the fourth period, for instance palladium. Of course, in some instances the metal may be originally present in the form of its oxide, but this is equivalent to using the free metal as the oxide is reduced to the metal by the hydrogen present in the reaction mixture. The catalyst is effective in catalytic amounts but an excess is not detrimental. Platinum is the preferred catalyst.

The new reaction may be conducted over a large range of temperatures and pressures. For instance, temperatures ranging from about 0–140° C. and pressures from about atmospheric to 2,000 pounds per square inch or even higher are satisfactory. As the reaction goes well at low pressures, pressures of from about 1 to 3 atmospheres are preferred for reasons of convenience. The optimum reaction temperature is about 20–35° C.

The reaction time is best measured by the amount of hydrogen absorbed as the actual time will vary widely depending upon a number of factors, for instance temperature, pressure and the type and condition of the catalyst. For example, the complete reaction may take from one-half to five hours at 20° C. and from about five minutes to one hour at 80° C. Theoretically, of course, the reaction will be complete when one mole of hydrogen has been absorbed for each mole of 3 - [beta - keto - gamma(tetrahydro - 2 - pyridyl) propyl]-4-quinazolone originally present in the reaction mixture. Since, however, even under optimum conditions the reduction is not 100% selective, best results will be obtained in a batch process if the reaction is continued until about 1.0 to 1.2 mols of hydrogen have been absorbed for each mole of 3-[beta-keto-gamma-(tetrahydro - 2 - pyridyl) propyl] - 4 - quinazolone originally present in the reaction mixture. Under no circumstances should the reaction be continued until more than about 1.4 mols of hydrogen per mole of tetrahydropyridyl compound have been absorbed as this results in a mixture of reduction products which is extremely difficult to separate. As the percentage of by-products formed increases as the reaction approaches completion, the reaction lends itself well to a cyclic process. In other words, the reaction may be stopped after about 0.5 mol of hydrogen per mol of tetrahydropyridyl compound has been absorbed, the reduction products removed, make-up tetrahydropyridyl compound and acid added and the reduction continued.

The process will be more particularly described by means of the following illustrative examples in which all parts are by weight unless otherwise indicated.

*Example I*

A solution of 6.0 parts by weight of sodium methoxide, 24 parts by volume of methyl acetoacetate and 30 parts by weight of gamma-bromopropylphthalimide (Ber., 21, 2671) in 1500 parts by volume of methanol is refluxed for sixteen hours, then 300 parts by volume of 3N hydrochloric acid is added and the refluxing continued for four hours. The solution is concentrated in vacuo and the separating oil extracted with ethyl acetate. Evaporation of the extract gives crude 1-phthalimido-5-hexanone as an oil. When purified through its sodium bisulfite derivative, this compound forms white crystals having a melting point of 66–68° C. It is readily soluble in alcohol, acetone, ether or benzene but insoluble in water or petroleum ether.

A mixture of 49 parts by weight of crude 1-phthalimido-5-hexanone, 490 parts by volume of benzene, 29 parts by volume of absolute ethanol, 33.3 parts by weight of ethyl 4-quinazolone-3-acetate and 9.8 parts by weight of sodium methoxide is refluxed for one hour, then acidified with 40 parts by volume of acetic acid and washed with water. The organic solution is evaporated, the residue dissolved in ethyl acetate and shaken with 300 parts by volume of 10% cupric acetate. The copper derivative of 3-(beta,delta-diketo-omega-phthalimidooctyl)-4-quinazolone separates as blue green crystals having a melting point of about 235° C. with decomposition.

A mixture of 1 part by weight of the copper derivative of 3 - (beta,delta - diketo - omega - phthalimidooctyl) -4-quinazolone and 20 parts by volume of 6N hydrochloric acid is refluxed for six hours. The solution is concentrated in vacuo until phthalic acid separates, then it is cooled and filtered. The filtrate is evaporated to dryness in vacuo, the residue dissolved in water and poured into excess ammonia water. The mixture is then extracted with chloroform. The combined extracts are evaporated to dryness in vacuo after clarification with activated carbon (Norit). Trituration of the residue with ethyl acetate gives about .16 part by weight of 3-[beta-keto - gamma - (1,4,5,6 - tetrahydro - 2 - pyridyl) propyl]-4-quinazolone having a melting point of about 177–180° C. Recrystallization from alcohol gives white crystals having a melting point of about 175–178° C. This compound is soluble in hot alcohol, but insoluble in cold alcohol, benzene, ethyl acetate or petroleum ether. It is moderately soluble in chloroform.

A solution of .72 part by weight of 3-[beta-keto - gamma-(1,4,5,6-tetrahydro-2-pyridyl) propyl]-4-quinazolone in 50 parts by volume of methanol and 0.5 part by volume concentrated hydrochloric acid is shaken with hydrogen at 1 atmosphere in the presence of .1 part by weight of platinum oxide catalyst until one mol-equivalent of hydrogen is absorbed. Evaporation of the filtered solution to dryness in vacuo and trituration with absolute alcohol gives white crystals of 3-[beta-keto-delta-(2 - piperidyl) propyl] - 4 - quinazolone dihydrochloride monohydrate having a melting point of about 212–214° C. with decomposition. This compound is soluble in water or hot methanol, but insoluble in ethanol, acetone, ether or benzene.

*Example II*

A solution of 174 parts by weight of allylphthalimide (Ber., 23, 999) and 285 parts by weight of mercuric acetate in 1745 parts by volume of methanol is refluxed with stirring for ten minutes. A solution of 156 parts by weight of potassium iodide in 310 parts by volume of water is added and the mixture again refluxed ten minutes. Then 256 parts by weight of iodine is added. After being refluxed for fifteen minutes more a solution of 178 parts by weight of potassium iodide in 1260 parts by volume of water is added followed by sufficient sodium bisulfite to bleach the excess iodine. The mixture is diluted to 5000 parts by volume with water and cooled. The precipitate is recrystallized from alcohol giving white crystals of 2-methoxy-3-iodo-propylphthalimide having a melting point of about 105–107° C.

A mixture of 47 parts by weight of sodium methoxide, 464 parts by volume of t-butyl alcohol, 243 parts by weight of 2-methoxy-3-iodopropylphthalimide and 165 parts by volume of methyl acetoacetate is refluxed forty-two hours, then acidified with 47 parts by volume of acetic acid and evaporated to dryness in vacuo. The residue is refluxed with 555 parts by volume of alcohol and 555 parts by volume of 3N hydrochloric acid for three hours, concentrated to about one-half volume in vacuo, diluted with water and extracted with ethyl acetate. The extract, washed with aqueous sodium bicarbonate and dried, is evaporated to dryness. The residual crude 1-phthalimido-2-methoxy-5-hexanone is about 30% pure. It is purified through its solid sodium bisulfite derivative with about 99% recovery. This ketone is an oil soluble in alcohol, ethyl acetate and benzene, but insoluble in water. Its 2,4 - dinitrophenylhydrazone forms orange crystals having a melting point of about 180.5–181° C.

A mixture of 41 parts by weight of 1-phthalimido-2-methoxy-5-hexanone and 410 parts by volume of 6N hydrochloric acid is refluxed three hours, cooled, filtered and the filtrate evaporated to dryness in vacuo. The residual crude 1-amino-2-methoxy-5-hexanone hydrochloride is dissolved in 176 parts by volume of water and basified with a solution of 12.6 parts by weight of sodium hydroxide in 74 parts by volume of water. After the addition of 17.9 parts by volume of benzoyl chloride, the mixture is stirred twenty minutes. The mixture is treated with 6.3 parts by weight of sodium hydroxide in 22 parts by volume of water, then 4.5 parts by volume of benzoyl chloride is added and the stirring continued for thirty minutes more. The oil is removed by extraction with benzene. The combined extracts, washed with dilute acid and water, are evaporated leaving 26 parts by weight of 1-benzamido-2-methoxy-5-hexanone as an oil soluble in alcohol, benzene or acetone, but insoluble in water. The 2,4-dinitrophenylhydrazone forms yellow crystals having a melting point of about 132–134° C.

A mixture of 26 parts by weight of 1-benzamido - 2 - methoxy - 5 - hexanone, 28.5 parts by weight of ethyl 4-quanazolone-3-acetate, 260 parts by volume of benzene, 22 parts by volume of absolute alcohol and 7.6 parts by weight of sodium methoxide is refluxed for one hour, acidified with 15 parts by volume of acetic acid and washed with water. The organic layer is evaporated, the residue dissolved in 236 parts by volume of ethyl acetate and treated with 213 parts by volume of 10% cupric acetate. The blue crystals of the copper derivative of 3-(2,4-diketo-7-methoxy-8-benzamidooctyl)-4-quinazolone separate; melting point about 218–220° C. with decomposition. This compound is insoluble in common organic solvents.

A solution of 12.2 parts by weight of the copper derivative of 3-(2,4-diketo-7-methoxy-8-benzamidooctyl)-4-quinazolone in 47 parts by volume of water and 15.6 parts by volume of 96% sulfuric acid is refluxed for two hours, then poured into ice and 62 parts by volume of 28% ammonia water. The mixture is extracted with chloroform. The dried extracts are evaporated and the residue refluxed with 51 parts by volume of 48% hydrobromic acid for twenty minutes, then poured into ice and 51 parts by volume of 28% ammonia water. The precipitate is collected on a filter and washed with water. The combined filtrate and washings are extracted with chloroform. The precipitate is added to the extracts heated and sufficient 2-methoxyethanol added to dissolve the solid. The solution is dried and evaporated in vacuo. Trituration of the residue with ethyl acetate gives about 4 parts by weight of 3-[beta-keto-gamma-(5-hydroxy - 1,4,5,6 - tetrahydro-2-pyridyl)propyl]-4-quinazolone having a melting point of about 219–223° C. Recrystallization from alcohol gives white needles having a melting point of about 229–230° C. This compound is soluble in hot alcohol or hot 2-methoxyethanol but insoluble in cold alcohol, benzene or petroleum ether.

A solution of 1.0 part by weight of 3-[beta-keto - gamma - (5-hydroxy-1,4,5,6-tetrahydro-2-pyridyl)propyl]-4-quinazolone in 25 parts by volume of 6N hydrochloric acid is shaken with hydrogen at 1 atmosphere in the presence of .1 part by weight of platinum oxide until one mol-equivalent of hydrogen is absorbed (about two hours). The filtered solution is evaporated to dryness in vacuo. A solution of the residue in 10 parts by volume of water is basified with potassium carbonate and extracted with chloroform. The combined dried extracts are evaporated and the residue treated with absolute alcoholic hydrogen chloride. White crystals of 3-[beta-keto-gamma -(5-hydroxy-2-piperidyl)propyl]-4-quinazolone dihydrochloride having a melting point of about 222–225° C. with decomposition, separate. Recrystallization from methanol by the addition of absolute alcoholic hydrogen chloride raises the melting point to about 225–226° C. with decomposition. This compound is soluble in water and hot methanol, but insoluble in ethanol, acetone or ether.

*Example III*

A mixture of 4 parts by weight of acetanthranil (J. Am. Chem. Soc., 29, 529), 1.85 parts by weight of glycine and 4 parts by volume of diethyl carbitol is heated at 175–185° C. for fifteen minutes. Addition of 15 parts by volume of alcohol and cooling give white crystals of 2-methyl-4-quinazolone-3-acetic acid having a melting point of about 263° C. with decomposition after recrystallization from 2-methoxyethanol.

To a suspension of 3 parts by weight of 2-methyl-4-quinazolone-3-acetic acid in 17 parts by volume of methanol there is added 1.7 parts by volume of acetyl chloride. The solution is refluxed for thirty minutes, cooled, diluted with water and neutralized with sodium bicarbonate. The mixture is extracted with chloroform. The extracts are evaporated and the residue recrystallized from benzene-heptane to give white crystals of methyl 2-methyl-4-quinazolone-3-acetate having a melting point of about 114–115° C.

A mixture of 11.4 parts by weight of sodium methoxide, 285 parts by volume of methanol, 45 parts by volume of methylacetoacetate and 57 parts by weight of gamma-bromopropylphthalimide is refluxed for eighteen hours, diluted with several volumes of water and extracted with chloroform. The combined extracts, evaporated to dryness in vacuo, leave a residue which is refluxed with 570 parts by volume of 6N hydrochloric acid for nine hours. The cooled mixture is filtered from phthalic acid and the filtrate evaporated to dryness in vacuo. The residue of 1-amino-5-hexanone hydrochloride is dissolved in 168 parts by volume of water, then a solution of 14 parts by weight of sodium hydroxide in 84 parts by volume of water is added. The stirred mixture is treated dropwise with 23 parts by volume of ethyl chlorocarbonate over a period of ten minutes, then stirred twenty minutes longer. After the addition of 7 parts by weight of sodium hydroxide in 42 parts by volume of water and 5 parts by volume of ethyl chlorocarbonate, the mixture is stirred ten minutes more. The oil is extracted with benzene. Evaporation gives 1-carbethoxyamino-5-hexanone as an oil which gives a yellow 2,4-dinitrophenylhydrazone having a melting point of about 128–129° C.

A mixture of 5.8 parts by weight of methyl 2-methyl-4-quinazolone-3-acetate, 7 parts by weight of 1-carbethoxyamino-5-hexanone, 83 parts by volume of benzene, 5 parts by volume of absolute alcohol and 1.7 parts by weight of sodium methoxide is refluxed for one hour. The blue crystals of the copper derivative of 2-methyl-3-(2,4-diketo-8-carbethoxyaminooctyl) - 4 - quinazolone separate; melting point about 201–202° C. with decomposition. This compound is insoluble in common solvents.

A solution of .15 part by weight of the copper salt of 2-methyl-3-(2,4-diketo-8-carbethoxyaminooctyl)-4-quinazolone in 1.45 parts by volume of 48% hydrobromic acid is refluxed for five minutes, then poured into ice and 3 parts by volume of 28% ammonia water and extracted with chloroform. The dried extracts are evaporated and the residue triturated with ethyl acetate to give 2-methyl-3-[beta-keto-gamma-(1,4,5,6-tetrahydro-2-pyridyl)propyl]-4-quinazolone having a melting point of about 195–198° C. Recrystallization from alcohol gives white leaflets having a melting point of about 198–198.5° C. This compound is soluble in hot alcohol or chloroform, but insoluble in cold alcohol, water, ethyl acetate or petroleum ether.

A solution of 1.25 parts by weight of 2-methyl-3-[beta-keto-gamma-(1,4,5,6-tetrahydro - 2 - pyrydyl)propyl]-4-quinazolone in 50 parts by volume of 6N hydrochloric acid is shaken with hydrogen in the presence of .1 part by weight of platinum oxide catalyst until one mol-equivalent of hydrogen is absorbed (about three hours). The filtered solution is evaporated to dryness in vacuo and the residue crystallized from absolute alcoholic hydrogen chloride by the addition of ether. Recrystallization from absolute alcohol-ether gives hygroscopic white crystals of 2-methyl-3-[beta-keto-gamma - (2 - piperidyl)propyl]-4-quinazolone dihydrochloride monohydrate having a melting point of about 187–189° C. with decomposition. This compound is soluble in water, methanol or ethanol, but insoluble in ether, acetone or benzene.

*Example IV*

To a solution of 44 parts by weight of 5-methyl-4-quinazolone (Ber., 52, 1084) and 14.8 parts by weight of sodium methoxide in 400 parts by volume of absolute alcohol there is added 28.8 parts by volume of ethyl chloroacetate. The mixture is refluxed two hours, diluted with water and extracted with chloroform. Evaporation of the extracts to dryness in vacuo and crystallization of the residue from heptane gives ethyl 5-methyl-4-quinazolone-3-acetate.

Example III is repeated except that 30.5 parts by weight of ethyl 5-methyl-4-quinazolone-3-acetate are employed in place of the ethyl 4-quinazolone-3-acetate of that example. White crystals of 3-[beta-keto-gamma-(5-hydroxy-2-piperidyl)propyl]-5-methyl-4-quinazolone dihydrochloride are obtained in equally good yield.

*Example V*

A mixture of 48 parts by weight of 6-chloroanthranilic acid (Monats., 22, 448) in 42 parts by volume of formamide is heated at about 130–135° C. for forty-five minutes and at 175° C. for seventy-five minutes. Addition of 72 parts by volume of 2-methoxyethanol and 720 parts by volume of water gives 5-chloro-4-quinazolone having a melting point of about 210° C. after recrystallization from aqueous 2-methoxyethanol.

To a solution of 37.2 parts by weight of 5-chloro-4-quinazolone and 11.1 parts by weight of sodium methoxide in 300 parts by volume of absolute alcohol there is added 21.6 parts by volume of ethyl chloroacetate. The mixture is refluxed two hours, diluted with water and extracted with chloroform. Evaporation of the extracts to dryness in vacuo and crystallization of the residue from heptane gives ethyl 5-chloro-4-quinazolone-3-acetate.

Example III is repeated except that 32.5 parts by weight of ethyl 5-chloro-4-quinazolone-3-acetate are employed in place of the ethyl 4-quinazolone-3-acetate of that example. White crystals of 3-[beta-keto-gamma-(5-hydroxy-2-piperidyl)-propyl]-5-chloro-4-quinazolone dihydrochloride are obtained in equally good yield.

We claim:

1. The method of preparing 3-[beta-keto-gamma-(2 - piperidyl)-propyl] - 4 - quinazolones and acid addition salts thereof which comprises reacting a 3-[beta-keto-gamma-(tetrahydro-2-pyridyl)-propyl]-4-quinazolone with not more than 1.4 mol-equivalents of hydrogen in the presence of a hydrogenation catalyst and in an inert solvent containing at least one mol-equivalent of a nonoxidizing acid having a dissociation constant in water of at least $1 \times 10^{-2}$.

2. The method of claim 1 wherein said 3-[beta-keto - gamma-(tetrahydro-2-pyridyl)propyl] - 4 - quinazolone is 3-[beta-keto-gamma-(1,4,5,6-tetrahydro-2-pyridyl)propyl]-4-quinazolone.

3. The method of preparing 3-[beta-keto-gamma-(hydroxy-2-piperidyl)-propyl] - 4 - quinazolones which comprises reacting a 3-[beta-keto-gamma-(hydroxy - tetrahydro - 2 - pyridyl)-propyl]-4-quinazolone with not more than 1.4 mol-equivalents of hydrogen in the presence of a hydrogenation catalyst and in an inert solvent containing at least one mol-equivalent of a nonoxidizing acid having a dissociation constant in water of at least $1 \times 10^{-2}$.

4. The method of preparing 3-[beta-keto-gamma-(2-piperidyl)-propyl]-methyl - 4 - quinazolones which comprises reacting a 3-[beta-keto - gamma - (tetrahydro - 2 - pyridyl)propyl]-methyl-4-quinazolone with not more than 1.4 mol-equivalents of hydrogen in the presence of a hydrogenation catalyst and in an inert solvent containing at least one mol-equivalent of a nonoxidizing acid having a dissociation constant in water of at least $1 \times 10^{-2}$.

5. The method of preparing 3-[beta-keto-gamma-(hydroxy-2 - piperidyl)propyl] - methyl-4-quinazolones which comprises reacting a 3-[beta - keto - gamma - (hydroxy - tetrahydro-2 - pyridyl) - propyl] - methyl-4-quinazolone with not more than 1.4 mol-equivalents of hydrogen in the presence of a hydrogenation catalyst and in an inert solvent containing at least one mol-equivalent of a nonoxidizing acid having a dissociation constant in water of at least $1 \times 10^{-2}$.

6. The method of preparing 3-[beta-keto-gamma-(hydroxy-2-piperidyl)-propyl] - halo - 4-quinazolones which comprises reacting a 3-[beta-keto - gamma - (hydroxy-tetrahydro - 2 - pyridyl)propyl]-halo-4-quinazolone with not more than 1.4 mol-equivalents of hydrogen in the presence of a hydrogenation catalyst and in an inert solvent containing at least one mol-equivalent of a nonoxidizing acid having a dissociation constant in water of at least $1 \times 10^{-2}$.

7. The method of claim 3 wherein said catalyst is platinum and said mineral acid is hydrochloric acid.

8. The method of claim 4 wherein said catalyst is platinum and said mineral acid is hydrochloric acid.

9. The method of claim 5 wherein said catalyst is platinum and said mineral acid is hydrochloric acid.

10. The method of claim 6 wherein said catalyst is platinum and said mineral acid is hydrochloric acid.

BERNARD R. BAKER.
MERLE V. QUERRY.

No references cited.